(12) United States Patent
Takahashi et al.

(10) Patent No.: US 11,664,697 B2
(45) Date of Patent: May 30, 2023

(54) WIRING MEMBER FOR ROTATING ELECTRICAL MACHINE, FIXING STRUCTURE OF WIRING MEMBER FOR ROTATING ELECTRICAL MACHINE, AND ROTATING ELECTRICAL MACHINE

(71) Applicant: Hitachi Metals, Ltd., Tokyo (JP)

(72) Inventors: Noriyuki Takahashi, Tokyo (JP); Jun Umetsu, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 174 days.

(21) Appl. No.: 16/991,876

(22) Filed: Aug. 12, 2020

(65) Prior Publication Data

US 2021/0066987 A1  Mar. 4, 2021

(30) Foreign Application Priority Data

Aug. 29, 2019 (JP) .............................. JP2019-156709

(51) Int. Cl.
*H02K 3/50* (2006.01)
*H02K 3/52* (2006.01)
(Continued)

(52) U.S. Cl.
CPC ................. *H02K 3/50* (2013.01); *H02K 3/38* (2013.01); *H02K 3/52* (2013.01); *H02K 5/225* (2013.01)

(58) Field of Classification Search
CPC ............ H02K 3/50; H02K 5/225; H02K 5/22; H02K 5/522; H02K 3/12; H02K 3/28;
(Continued)

(56) References Cited

U.S. PATENT DOCUMENTS

| 10,199,898 B2 | 2/2019 | Haruno et al. |
| 10,673,296 B2 | 6/2020 | Asahi et al. |
(Continued)

FOREIGN PATENT DOCUMENTS

| JP | 2014-128095 A | 7/2014 |
| JP | 2015-133873 A | 7/2015 |
(Continued)

OTHER PUBLICATIONS

Office Action issued in the corresponding Japanese Patent Application No. 2019-156709 dated Sep. 6, 2022; 7 pages.

*Primary Examiner* — Alexander A Singh
(74) *Attorney, Agent, or Firm* — Thomas W. Cole; Calderon Safran & Cole P.C.

(57) ABSTRACT

A wiring member for rotating electrical machine that connects coil ends of a stator to electrodes of a terminal block in a rotating electrical machine. The wiring member includes a plurality of conductive wires, and a holding portion for holding the plurality of conductive wires. The holding portion includes an adhesion portion adhered and fixed to a fixing target member. A fixing structure of wiring member for rotating electrical machine is configured that the wiring member for rotating electrical machine including the plurality of conductive wires and connecting coil ends of a stator to electrodes of a terminal block in the rotating electrical machine is fixed to a fixing target member. The rotating electrical machine includes the stator including a stator core and a plurality of coil pieces adhered and fixed to the stator core, and the wiring member for rotating electrical machine.

9 Claims, 8 Drawing Sheets

(51) Int. Cl.
*H02K 3/38* (2006.01)
*H02K 5/22* (2006.01)

(58) Field of Classification Search
CPC .......... H02K 3/34; H02K 3/345; H02K 3/487;
H02K 3/38; H02K 3/44; H02K 3/00;
H02K 5/08; H02K 3/52
USPC .......................................... 310/71, 214, 215
See application file for complete search history.

(56) References Cited

U.S. PATENT DOCUMENTS

| | | | |
|---|---|---|---|
| 2016/0336829 A1 | 11/2016 | Haruno et al. | |
| 2017/0110929 A1* | 4/2017 | Egami | H02K 5/225 |
| 2018/0278113 A1 | 9/2018 | Asahi et al. | |
| 2019/0097484 A1* | 3/2019 | Kaneshige | H02K 3/50 |
| 2020/0014276 A1* | 1/2020 | Osumi | H02K 3/50 |
| 2021/0367473 A1* | 11/2021 | Yoshimura | H02K 3/12 |

FOREIGN PATENT DOCUMENTS

| | | |
|---|---|---|
| JP | 2017-112670 A | 6/2017 |
| JP | 2018-160996 A | 10/2018 |
| JP | 2019-115170 A | 7/2019 |

* cited by examiner

WIRING MEMBER FOR ROTATING ELECTRICAL MACHINE, FIXING STRUCTURE OF WIRING MEMBER FOR ROTATING ELECTRICAL MACHINE, AND ROTATING ELECTRICAL MACHINE

CROSS-REFERENCE TO RELATED APPLICATION

The present application is based on Japanese Patent Application No. 2019-156709 filed on Aug. 29, 2019, the entire contents of which are incorporated herein by reference.

BACKGROUND OF THE INVENTION

1. Field of the Invention

The invention relates to a wiring member for rotating electrical machine, a fixing structure of wiring member for rotating electrical machine, and a rotating electrical machine.

2. Description of the Related Art

Wiring member for rotating electrical machine is known, which connects coil ends of a stator to electrodes of a terminal block in a rotating electrical machine. A member which is known as such a wiring member for rotating electrical machine is provided with plural conductive wires and a holding portion which holds the plural conductive wires (see, JP 2015-133873A).

[Patent Document 1] JP 2015-133873A

In the wiring member for rotating electrical machine described in JP 2015-133873A, the holding portion is not fixed to any of surrounding members. Therefore, when vibration is applied, connected portions between the conductive wires and the coil ends may be damaged by wobbling movement of the holding portion or the holding portion may be damaged by repeated collision with a stator core, etc. Particularly the wiring member for rotating electrical machine which is used in a rotating electrical machine mounted on a vehicle is affected by both vibration of cables connected to the electrodes of the terminal block and vibration of the rotating electrical machine, hence, measures against vibration are required to suppress damage due to vibration.

SUMMARY OF THE INVENTION

Therefore, it is an object of the invention to provide a wiring member for rotating electrical machine, a fixing structure of wiring member for rotating electrical machine, and a rotating electrical machine, in which damage due to vibration can be suppressed.

For the purpose of solving the above problems, one aspect of the present invention provides a wiring member for rotating electrical machine that connects coil ends of a stator to electrodes of a terminal block in a rotating electrical machine, the wiring member comprising a plurality of conductive wires; and a holding portion for holding the plurality of conductive wires, wherein the holding portion comprises an adhesion portion adhered and fixed to a fixing target member.

For the purpose of solving the above problems, another aspect of the present invention provides a fixing structure of wiring member for rotating electrical machine, the fixing structure being configured that a wiring member for rotating electrical machine comprising a plurality of conductive wires and connecting coil ends of a stator to electrodes of a terminal block in a rotating electrical machine is fixed to a fixing target member, wherein the wiring member for rotating electrical machine comprises a holding portion for holding the plurality of conductive wires, and the holding portion is adhered and fixed to the fixing target member.

For the purpose of solving the above problems, still another aspect of the present invention provides a rotating electrical machine, comprising a stator comprising a stator core and a plurality of coil pieces adhered and fixed to the stator core; and the wiring member for rotating electrical machine as described above, wherein the fixing target member comprises the stator core, and an adhesive for adhering and fixing the plurality of coil pieces to the stator core comprises the same material as an adhesive for adhering and fixing the holding portion to the stator core.

Points of the Invention

According to the present invention, it is possible to provide a wiring member for rotating electrical machine, a fixing structure of wiring member for rotating electrical machine, and a rotating electrical machine, in which damage due to vibration can be suppressed.

BRIEF DESCRIPTION OF THE DRAWINGS

Next, the present invention will be explained in more detail in conjunction with appended drawings, wherein.

DETAILED DESCRIPTION OF THE PREFERRED EMBODIMENT

Embodiment

An embodiment of the invention will be described below in conjunction with the appended drawings.

Figure 1A:
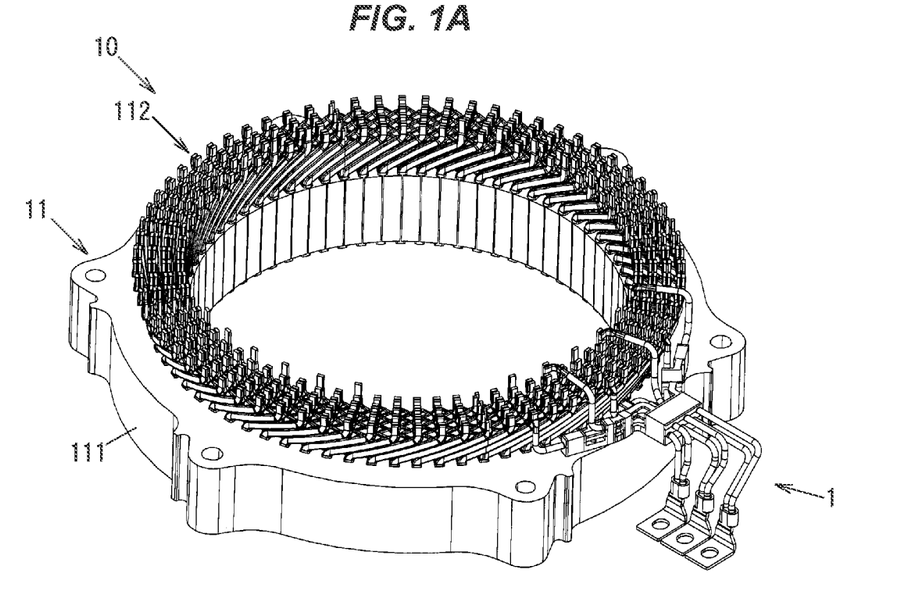
FIG. 1A is a perspective view showing a wiring member for rotating electrical machine in an embodiment of the present invention when attached to a stator core.
Figure 1B:
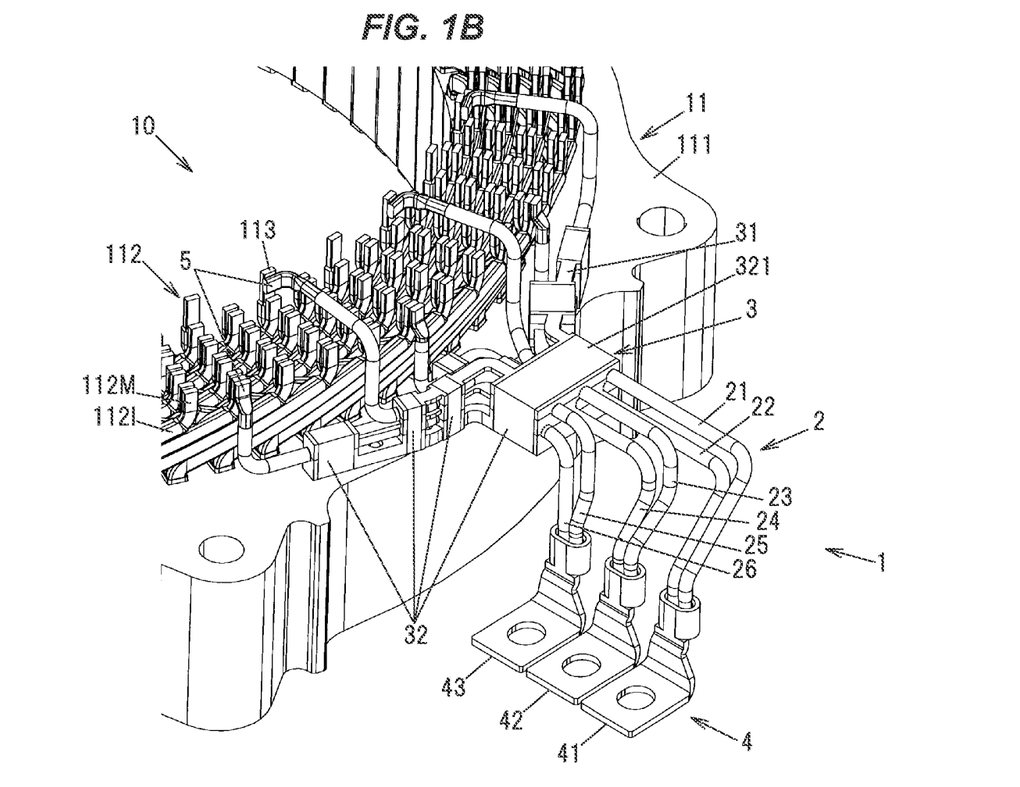
FIG. 1B is an enlarged view showing a main part of FIG. 1A.
Figure 2:
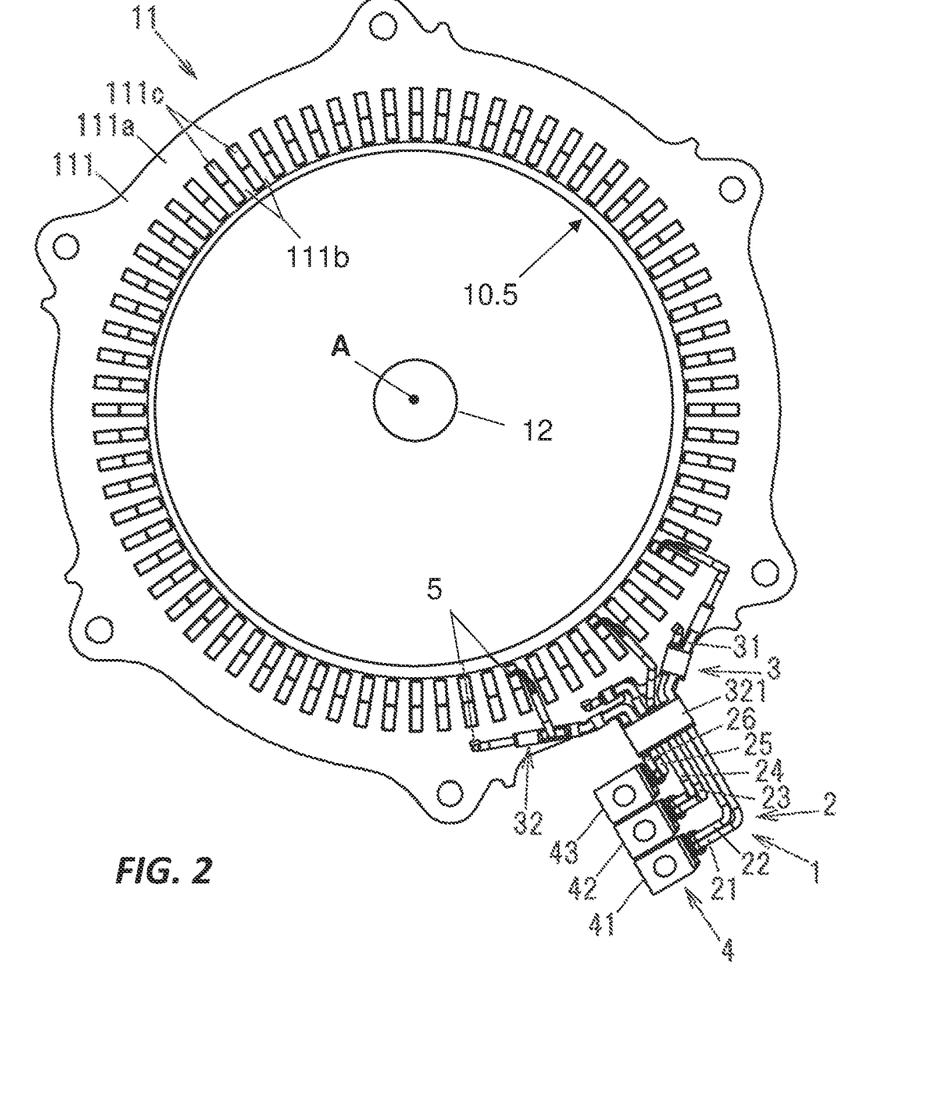
FIG. 2 is a plan view showing the stator core and the wiring member for rotating electrical machine.

FIG. 1A is a perspective view showing a wiring member for rotating electrical machine in an embodiment of the invention when attached to a stator core and FIG. 1B is an enlarged view showing a main part of FIG. 1A. FIG. 2 is a plan view showing the stator core and the wiring member for rotating electrical machine. A rotating electrical machine 10 using a wiring member 1 for rotating electrical machine in the present embodiment is mounted on a vehicle powered by electricity, such as electric vehicle or so-called hybrid vehicle. Although the rotating electrical machine 10 used as an electric motor is described in the following description, it is possible to use the rotating electrical machine 10 as a generator.

The rotating electrical machine 10 is provided with a rotor 10.5 and a stator 11 arranged to surround the rotor. The rotor 10.5 is configured that plural magnets are embedded in a rotor core formed of a soft magnetic metal, and the rotor 10.5 rotates with a shaft 12 which is inserted therethrough at the center. The stator 11 has a stator core 111 formed of a soft magnetic metal and plural coil pieces 112.

Hereinafter, a direction parallel to a rotational axis A of the shaft 12 is referred to as the axial direction, a direction passing the rotational axis and perpendicular to the rotational axis A is referred to as the radial direction, and a direction perpendicular to the axial and radial directions is referred to as the circumferential direction. In addition, in the following description, one of two axial sides of the stator core 111, where the wiring member 1 for rotating electrical machine is arranged, is referred to as the upper side and the opposite side is referred to as the lower side, for convenience of explanation. However, the upper and lower sides defined here do not specify top and bottom in the vertical direction in the state of being mounted on the vehicle.

The stator core 111 integrally has a cylindrical back yoke 111a and plural teeth 111b protruding radially inward from the back yoke 111a (see FIG. 2). Slots 111c are formed between the circumferentially adjacent teeth 111b.

Each coil piece 112 is housed and held in the slot 111c of the stator core 111. The coil piece 112 is composed of a conductive metal 112M having high conductivity such as copper or aluminum, and an electrically insulating covering layer 112I covering the surface of the conductive metal 112M. In the present embodiment, the conductive metal 112M is a rectangular solid wire having a rectangular cross-sectional shape, and the covering layer 112I is formed of an enamel coating. At a coil end 113 which is an end of the coil piece 112, the covering layer 112I is stripped and the conductive metal 112M is exposed. The coil pieces 112 are welded to each other at the coil ends 113 and form two sets of three-phase (U-, V- and W-phase) stator windings in such a manner that electrical angle phases are offset by a predetermined angle.

Each coil piece 112 is adhered and fixed to the stator core 111 by an adhesive (varnish) poured and solidified in the slot 111c. The adhesive used for fixing the coil pieces 112 desirably has heat resistance and does not lose adhesive strength due to heat of the rotating electrical machine 10, and it is possible to use a thermosetting resin. The thermosetting resin used as the adhesive includes epoxy resin, phenol resin, melamine resin, urea resin, unsaturated polyester resin and alkyd resin, etc. By adhering and fixing each coil piece 112 to the stator core 111, it is possible to reduce sliding wear of the coil pieces 112 caused by vibration.

The rotating electrical machine 10 is also provided with a housing (not shown) which houses the stator 11, and a terminal block (not shown) fixed to the housing. The terminal block has three electrodes to which three-phase AC currents are supplied from a controller. The terminal block is fixed to the housing, as an example.

The rotating electrical machine 10 is further provided with the wiring member 1 for rotating electrical machine in the present embodiment. The wiring member 1 for rotating electrical machine is a member for connecting the coil ends 113 of the stator 11 to the electrodes of the terminal block. In the present embodiment, the wiring member 1 for rotating electrical machine is adhered and fixed to the upper surface of the stator core 111 as a fixing target member. The details of the wiring member 1 for rotating electrical machine will be described below.

Wiring Member 1 for Rotating Electrical Machine

Figure 3:
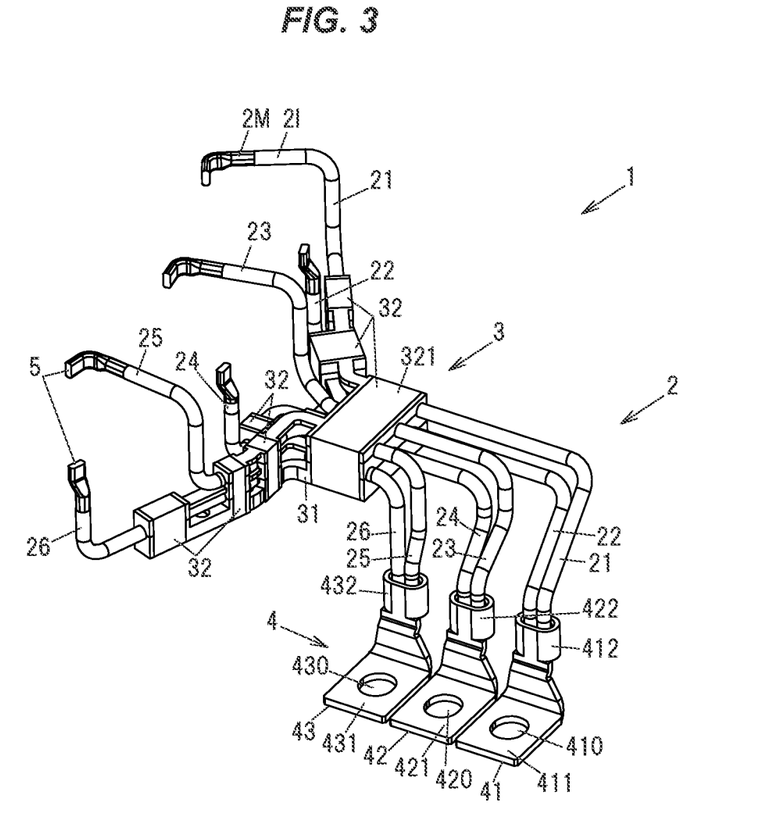
FIG. 3 is a perspective view showing the wiring member for rotating electrical machine.
Figure 4:
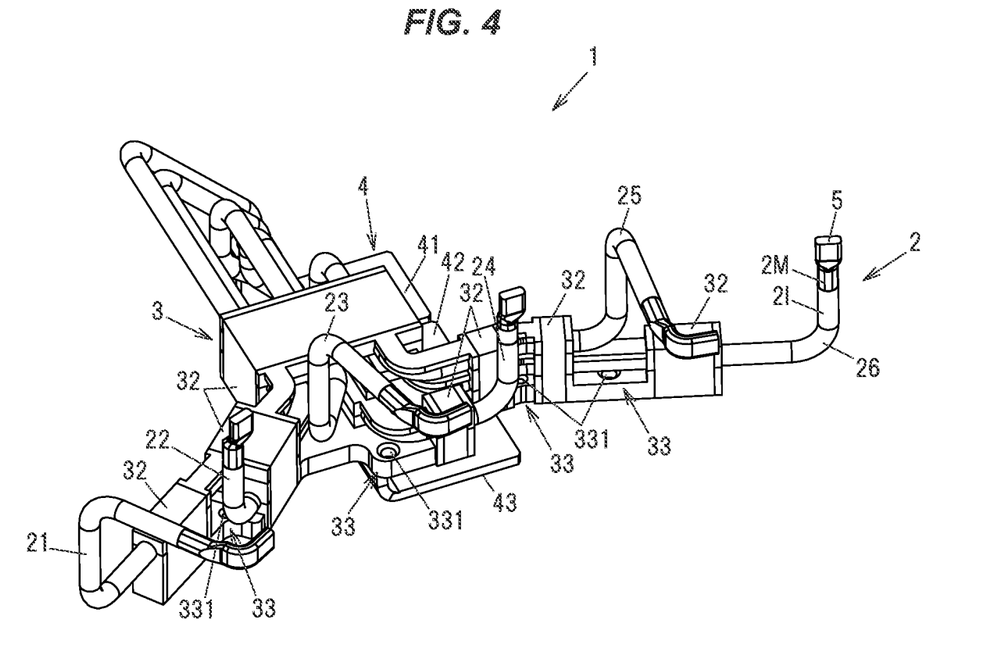
FIG. 4 is a perspective view showing the wiring member for rotating electrical machine.
Figure 5:
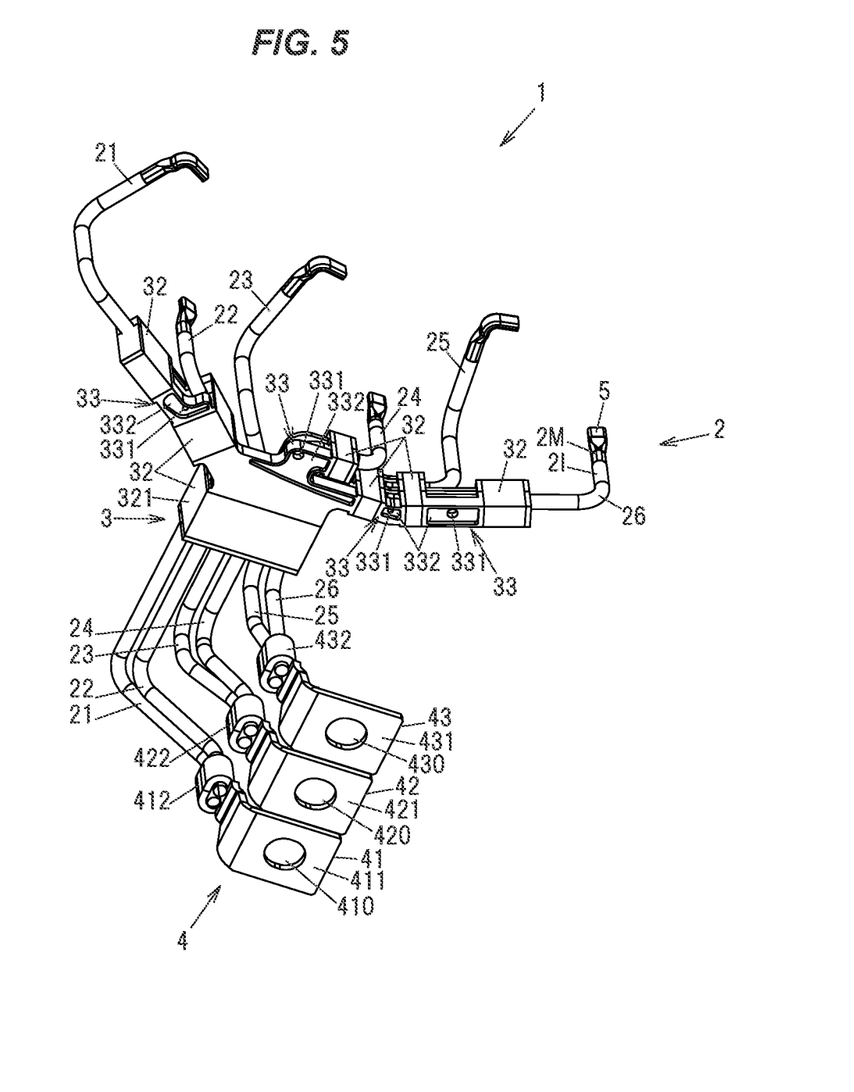
FIG. 5 is a perspective view showing the wiring member for rotating electrical machine.

FIGS. 3 to 5 are perspective views showing the wiring member 1 for rotating electrical machine. The wiring member 1 for rotating electrical machine is provided with plural conductive wires 2 and a holding portion 3 holding the plural conductive wires 2.

In the present embodiment, the wiring member 1 for rotating electrical machine is provided with six conductive wires 2 and three terminals 4, and connects the three electrodes of the terminal block respectively to the coil ends 113 of the coil pieces 112 of the respective phases. Although a so-called bus ring formed by shaping a conductive wire into an annular shape is known as a wiring member for rotating electrical machine, the wiring member 1 for rotating electrical machine in the present embodiment is different from the bus ring and is a non-annular wiring member of which conductive wires 2 are not formed in an annular shape. In addition, the six conductive wires 2 have high rigidity enough to be able to maintain the shape thereof.

The six conductive wires 2 consist of first and second U-phase lead wires 21, 22, first and second V-phase lead wires 23, 24, and first and second W-phase lead wires 25, 26. Each conductive wire 2 has a conductor 2M formed of a conductive metal and an electrically insulating covering layer 21 covering the surface of the conductor 2M. As the conductive metal, it is possible to suitably use, e.g., copper or copper alloy. As the covering layer 21, it is possible to suitably use an enamel film. The conductor 2M is a solid wire (a single metal conductor which is not a twisted wire) and, in the present embodiment, is formed by pressing a round solid wire having a circular cross-sectional shape into a predetermined shape. Alternatively, the conductor 2M may be formed using a rectangular solid wire having a rectangular cross-sectional shape.

The three terminals 4 consist of a U-phase terminal 41, a V-phase terminal 42, and a W-phase terminal 43. The U-phase terminal 41 has a plate portion 411 connected to the U-phase electrode of the terminal block, and a crimping portion 412 by which one ends of the first and second U-phase lead wires 21, 22 are crimped together. A bolt insertion hole 410 is formed on the plate portion 411, and the plate portion 411 is connected to the U-phase electrode of the terminal block by a bolt (not shown) inserted through the bolt insertion hole 410. Likewise, the V-phase terminal 42 has a plate portion 421 connected to the V-phase electrode of the terminal block, and a crimping portion 422 by which one ends of the first and second V-phase lead wires 23, 24 are crimped together. A bolt insertion hole 420 is formed on the plate portion 421, and the plate portion 421 is connected to the V-phase electrode of the terminal block by a bolt (not shown) inserted through the bolt insertion hole 420. The W-phase terminal 43 also has a plate portion 431 connected to the W-phase electrode of the terminal block, and a crimping portion 432 by which one ends of the first and second W-phase lead wires 25, 26 are crimped together. A bolt insertion hole 430 is formed on the plate portion 431, and the plate portion 431 is connected to the W-phase electrode of the terminal block by a bolt (not shown) inserted through the bolt insertion hole 430.

At the other end of each conductive wire 2 (an end on the opposite side to the terminals 4), the covering layer 21 is removed over a predetermined length range and a connecting portion 5 with the exposed conductor 2M is provided. The connecting portion 5 is welded to the coil end 113 of the corresponding coil piece 112 by TIG (Tungsten Inert Gas) welding which is a type of arc welding process using an inert gas. The connecting portion 5 is formed by pressing so that a surface facing the coil end 113 is flat.

The holding portion 3 has plural holders 31 holding the conductive wires 2 each in a predetermined wiring shape, and molded resin portions 32 formed by molding a resin so as to partially cover the plural holders 31. The plural holders 31 are provided to sandwich the conductive wires 2 from above and below. The plural holders 31 serve to suppress displacement of the conductive wires 2 due to resin pressure during molding of the molded resin portions 32 and to hold the conductive wires 2 in a predetermined wiring shape. Meanwhile, plural molded resin portions 32 (seven in this example) are provided to cover portions of the plural holders 31 together with portions of the conductive wires 2 sandwiched by the holders 31, and serve to integrate the plural holders 31.

The molded resin portions 32 may be provided to entirely cover the plural holders 31, but in this case, a large area of the conductive wires 2 is covered with the resin and this may cause a decrease in dissipation of heat generated in the conductive wires 2. By providing the plural molded resin portions 32 so as to only partially cover the plural holders 31 and so as to be spaced from each other as in the present embodiment, it is possible to increase the exposed portions of the conductive wires 2 and improve dissipation of heat generated in the conductive wires 2 while integrating the plural holders 31 with sufficient strength.

The holders 31 and the molded resin portions 32 are desirably formed of the same material so that the holders 31 and the molded resin portions 32 are melted and integrated during molding of the molded resin portions 32. In addition, the holders 31 and the molded resin portions 32 are desirably formed of a material having rigidity to hold the conductive wires 2. In particular, it is possible to use the holders 31 and the molded resin portions 32 which are formed of, e.g., PPS (polyphenylene sulfide).

Of the molded resin portions 32 provided at plural positions, at least some of the molded resin portions 32 (one molded resin portion 32 in the illustrated example) are provided so that all the six conductive wires 2 are covered together. Hereinafter, the molded resin portion 32 covering all the conductive wires 2 is referred to as an all-wire molded portion 321. The all-wire molded portion 321 is one of the plural molded resin portions 32 and is the molded resin portion 32 which is located closest to the terminals 4 in the longitudinal direction of each the conductive wire 2.

Adhesion Portion

Figure 6:
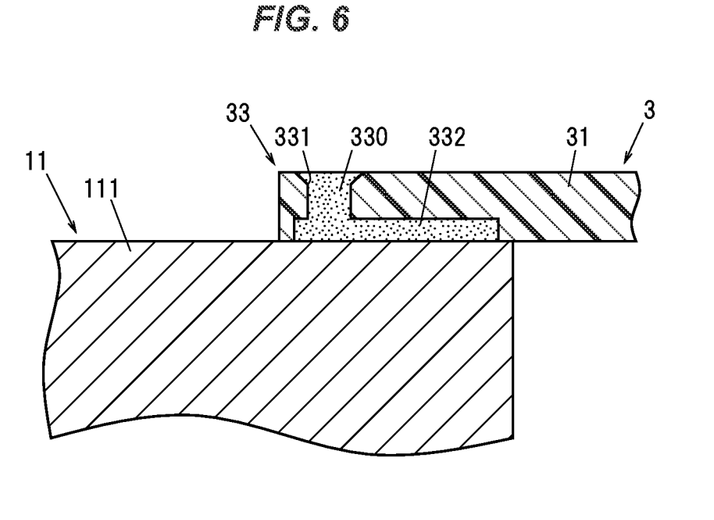
FIG. 6 is a cross sectional view showing an adhesion portion.

As shown in FIGS. 4 to 6, the holding portion 3 of the wiring member 1 for rotating electrical machine in the present embodiment has adhesion portions 33 to be adhered and fixed to the stator core 111 as the fixing target member. That is, a fixing structure of wiring member for rotating electrical machine in the present embodiment is a structure in which the holding portion 3 is adhered and fixed to the fixing target member. Although an example in which the fixing target member is the stator core 111 is described here, it is not limited thereto. The fixing target member may be, e.g., a housing which houses the stator 11. Further alternatively, the fixing target member may be an insulating plate or a metal plate arranged on the stator core 111.

Wobbling movement of the wiring member 1 for rotating electrical machine due to vibration is suppressed by adhering and fixing the holding portion 3 to the stator core 111 as the fixing target member, resulting in that damage on the connected portions between the conductive wires 2 and the coil ends 113 due to wobbling movement of the holding portion 3 and damage on the holding portion 3 due to repeated collision with the stator core 111 are suppressed.

In the present embodiment, the adhesion portions 33 are fixed to the stator core 111 by an adhesive 330. Each adhesion portion 33 has an introduction hole 331 for introducing the adhesive 330 to an interface between the adhesion portion 33 and the stator core 111. The adhesive 330 desirably has heat resistance and does not lose adhesive strength due to heat of the rotating electrical machine 10, and a thermosetting resin is preferably used. It is also desirable to use the adhesive 330 which is formed of the same material as the adhesive used for fixing the coil pieces 112 to the stator core 111. In this case, work of adhering and fixing the coil pieces 112 to the stator core 111 and work of adhering and fixing the wiring member 1 for rotating electrical machine to the stator core 111 can be simultaneously carried out by also pouring the adhesive 330 into the introduction holes 331 during work of pouring the adhesive in the slots 111c of the stator core 111, hence, work can be simplified. In this regard, a configuration in which the adhesive 330 is pre-applied to the bottom surfaces of the adhesion portions 33 could be possible, but in this case, the position of the wiring member 1 for rotating electrical machine is fixed before welding the connecting portions 5 of the conductive wires 2 and it may be difficult to adjust the welding position. In addition, unlike as described above, the adhesive 330 needs to be applied to the adhesion portions 33 separately from the work of adhering the coil pieces 112 and it takes time and effort for the work. By configuring to introduce the adhesive 330 from the introduction holes 331 as in the present embodiment, it is possible to adhere and fix the wiring member 1 for rotating electrical machine to the stator core 111 while facilitating the work of welding the connecting portions 5 of the conductive wires 2 to the coil ends 113.

In addition, in the present embodiment, each adhesion portion 33 has an adhesive filling portion 332 formed in a recessed shape on the bottom surface of the adhesion portion 33 and the introduction hole 331 is configured to allow the adhesive 330 to be introduced into the adhesive filling portion 332. Thus, it is possible to ensure that the amount of the material to be filled between the adhesion portion 33 and the stator core 111 is supplied, and the adhesion portion 33 can be adhered and fixed to the stator core 111 more firmly. The depth of the adhesive filling portion 332 only needs to be able to contain the adhesive 330 in an amount enough to fix the adhesion portion 33, and is preferably not less than 1 mm.

The example in which four adhesion portions 33 are provided is shown in the drawings. In details, in the present embodiment, four adhesive filling portions 332 are formed on the bottom surface of the lowermost holder 31 (arranged on the stator core 111 side), and four introduction holes 331 allowing the adhesive 330 to be respectively introduced in the adhesive filling portions 332 are formed so as to open upward (on a side opposite to the bottom surface). By forming plural adhesion portions 33, it is possible to fix the wiring member 1 for rotating electrical machine to the stator core 111 more firmly. In addition, by forming the introduction holes 331 so as to open upward, it is easy to introduce the adhesive 330 into the introduction holes 331. It is also possible to form the adhesion portions 33 (the introduction holes 331 and the adhesive filling portions 332) on the molded resin portions 32, but this causes a mold used for molding to have a complicated shape. Therefore, it is more preferable that the introduction holes 331 and the adhesive filling portions 332 be formed on the holder 31 which can be easily pre-molded into a complicated shape.

The adhesion portions 33 are desirably provided on a side where the plural conductive wires 2 extend out to be connected to the coil ends (on the center axis side of the stator core 111), relative to the all-wire molded portion 321. This suppresses an increase in size of the wiring member 1 for rotating electrical machine which is caused by providing the adhesion portions 33. Meanwhile, if the adhesive 330 is stuck to the outer circumferential surface of the stator core 111, it is difficult to place the stator core 111 into the housing in some cases, and it is necessary to suppress the adhesive 330 from leaking to the outer circumferential side of the stator core 111. By providing the adhesion portions 33 on the center axis side of the stator core 111 relative to the all-wire molded portion 321, the adhesive 330 is less likely to leak to the outer circumferential side of the stator core 111.

Furthermore, the adhesion portions 33 are desirably provided at least in the vicinity of the all-wire molded portion 321 since the weight of the holding portion 3 is largest in the vicinity of the all-wire molded portion 321. In addition, adhesive strength of the adhesion portion 33 closest to the all-wire molded portion 321 is desirably as high as possible so as to be resistant to vibration and to suppress separation of the all-wire molded portion 321. Therefore, of the plural adhesion portions 33, the adhesion portion 33 closest to the all-wire molded portion 321 has the largest adhesive filling portion 332 (the largest opening area and the largest capacity of the adhesive filling portion 332) in the present embodiment.

Method for Manufacturing Rotating Electrical Machine 10

To manufacture the rotating electrical machine 10, firstly, the coil pieces 112 are inserted into the slots 111c of the stator core 111, and the coil pieces 112 on the coil end 113 side are then twisted into shape. After that, the connecting portion 5 of each conductive wire 2 of the wiring member 1 for rotating electrical machine is welded to the corresponding coil end 113 by TIG welding.

After that, an adhesive is poured into the slots 111c of the stator core 111 and the adhesive 330 into the adhesive filling portions 332 via the introduction holes 331, and the stator 11 and the wiring member 1 for rotating electrical machine are placed in a constant-temperature oven and are heated to thermally cure the adhesive 330. Through this process, the coil pieces 112 are adhered and fixed to the stator core 111 and the wiring member 1 for rotating electrical machine is also adhered and fixed to the stator core 111. The stator core 111 to which the wiring member 1 for rotating electrical machine is adhered and fixed is placed in the housing, the terminal 4 of each conductive wire 2 is connected to the corresponding electrode of the terminal block, and a separately made rotor is placed in the stator 11, thereby obtaining the rotating electrical machine 10.

Modifications

Figure 7A:
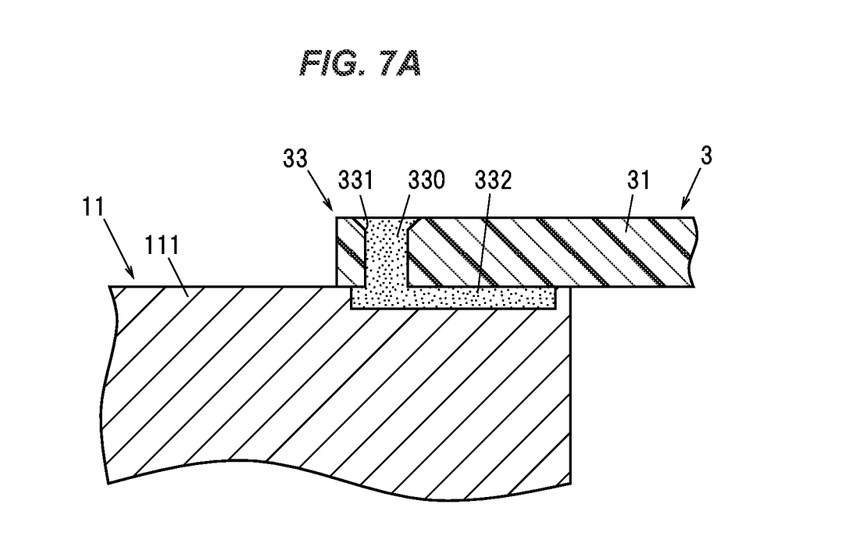
FIGS. 7A and 7B are diagrams illustrating modifications of the adhesion portion.
Figure 7B:
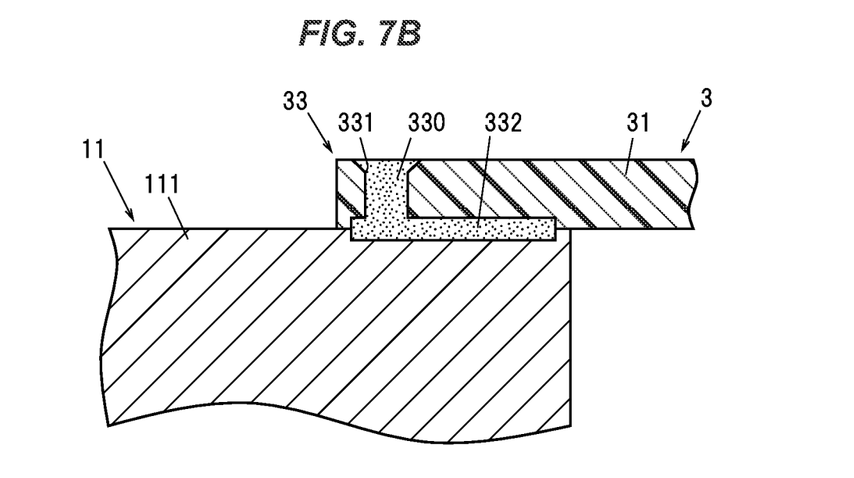

Although the adhesive filling portions 332 are formed on the holding portion 3 in the embodiment, the adhesive filling portions 332 having a recessed shape may be formed on the upper surface of the stator core 111 as the fixing target member, as shown in FIG. 7A. Alternatively, the adhesive filling portions 332 may be formed on both the holding portion 3 and the stator core 111, as shown in FIG. 7B.

Figure 8A:
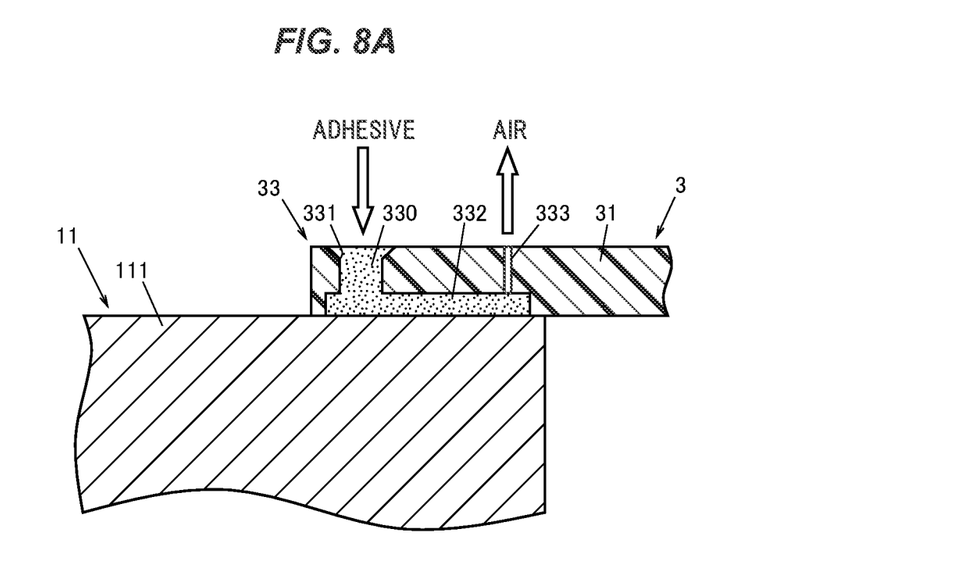
FIGS. 8A and 8B are diagrams illustrating modifications of the adhesion portion.

Additionally, an air hole 333 may be provided to allow the air in the adhesive filling portion 332 to escape at the time of filling the adhesive filling portion 332 with the adhesive 330 as shown in FIG. 8A, even though it is not mentioned in the embodiment. In this case, poor filling with the adhesive 330 due to the air remaining in the adhesive filling portion 332 can be suppressed. In this regard, although the air hole 333 in FIG. 8A is provided to open upward, the air hole 333 may be provided so as to open laterally (in a direction perpendicular to the axial direction). In this case, the air hole 333 is desirably formed to open radially inward to suppress the adhesive 330 from leaking through the air hole 333 to the outer circumferential side of the stator core 111. It is also possible to provide the air hole 333 on the stator core 111.

Figure 8B:
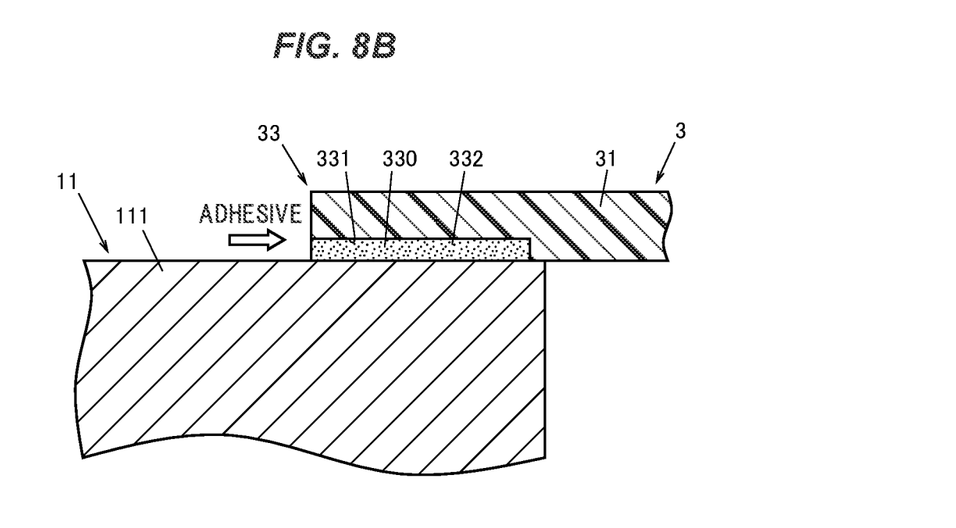

Furthermore, although the introduction hole 331 in the embodiment is formed to open upward, the introduction hole 331 may be formed to open, e.g., laterally (in a direction perpendicular to the axial direction), as shown in FIG. 8B. Also in this case, the introduction hole 331 is desirably formed to open radially inward to suppress the adhesive 330 from leaking to the outer circumferential side of the stator core 111 at the time of introducing the adhesive into the introduction hole 331. However, in view of easily introducing the adhesive 330, the adhesive 330 formed to open upward is more preferable.

In addition, a molded resin may be further provided so that the stator core 111 as the fixing target member, the coil pieces 112 and the wiring member 1 for rotating electrical machine are partially covered, even though it is not mentioned in the embodiment. In the present embodiment, since the holding portion 3 is adhered and fixed to the stator core 111 as the fixing target member, displacement of the wiring member 1 for rotating electrical machine due to resin pressure during molding the molded resin can be suppressed.

Functions and Effects of the Embodiment

As described above, the wiring member 1 for rotating electrical machine in the present embodiment is provided with the holding portion 3 holding the plural conductive wires 2 and the holding portion 3 has the adhesion portions 33 to be adhered and fixed to the fixing target member (the stator core 111 in this example).

Since the wiring member 1 for rotating electrical machine is adhered and fixed to the fixing target member (the stator core 111 in this example) in this configuration, damage on the connected portions between the conductive wires 2 and the coil ends 113 due to wobbling movement of the holding portion 3 and damage on the holding portion 3 due to repeated collision with the stator core 111, which are caused by vibration, are suppressed.

SUMMARY OF THE EMBODIMENT

Technical ideas understood from the above described embodiment will be described below citing the reference numerals, etc., used for the embodiment. However, each reference numeral, etc., described below is not intended to limit the constituent elements in the claims to the members, etc., specifically described in the embodiment.

[1] A wiring member (1) for rotating electrical machine that connects coil ends (113) of a stator (11) to electrodes of a terminal block in a rotating electrical machine (10), the wiring member (1) comprising: a plurality of conductive wires (2); and a holding portion (3) for holding the plurality of conductive wires (2), wherein the holding portion (3) comprises an adhesion portion (33) adhered and fixed to a fixing target member.

[2] The wiring member (1) for rotating electrical machine described in [1], wherein the adhesion portion (33) comprises an introduction hole (331) for introducing an adhesive (330) to an interface between the holding portion (3) and the fixing target member.

[3] The wiring member (1) for rotating electrical machine described in [2], wherein the adhesion portion (33) comprises an adhesive filling portion (332) formed in a recessed shape on the bottom surface of the holding portion (3), and the introduction hole (331) is configured to allow the adhesive (330) to be introduced into the adhesive filling portion (332).

[4] The wiring member (1) for rotating electrical machine described in any one of [1] to [3], wherein the holding portion (3) comprises a plurality of holders (31) holding the conductive wires (2) in shape of wiring, and a molded resin portion (32) including a molded resin so as to partially cover the plurality of holders (31) and integrating the plurality of holders (31), and the adhesion portion (33) is provided on the holder (31).

[5] The wiring member (1) for rotating electrical machine described in [4], wherein the holding portion (3) comprises the molded resin portion (321) provided to cover all the plurality of conductive wires (2) together, and the adhesion portion (33) is provided on a side where the plurality of conductive wires (2) extend out to be connected to the coil ends (113), relative to the molded resin portion (321).

[6] A fixing structure of wiring member for rotating electrical machine, the fixing structure being configured that a wiring member (1) for rotating electrical machine comprising a plurality of conductive wires (2) and connecting coil ends (113) of a stator (11) to electrodes of a terminal block in a rotating electrical machine (10) is fixed to a fixing target member, wherein the wiring member (1) for rotating electrical machine comprises a holding portion (3) for holding the plurality of conductive wires (2), and the holding portion (3) is adhered and fixed to the fixing target member.

[7] The fixing structure of wiring member for rotating electrical machine described in [6], wherein an adhesive filling portion (332) having a recessed shape and to be filled with an adhesive (330) is provided on one or both of the bottom surface of the holding portion (3) and the fixing target member, and the holding portion (3) is adhered and fixed to the fixing target member by the adhesive (330) filling the adhesive filling portion (332).

[8] The fixing structure of wiring member for rotating electrical machine described in [7], wherein the holding portion (3) comprises an introduction hole (331) formed to open on a side opposite to the bottom surface and provided to introduce the adhesive (330) into the adhesive filling portion (332).

[9] The fixing structure of wiring member for rotating electrical machine described in [7] or [8], wherein the adhesive (330) comprises a thermosetting resin.

[10] A rotating electrical machine (10), comprising: a stator (11) comprising a stator core (111) and a plurality of coil pieces (112) adhered and fixed to the stator core (111); and the wiring member (1) for rotating electrical machine described in any one of [1] to [5], wherein the fixing target member comprises the stator core (111), and an adhesive for adhering and fixing the plurality of coil pieces (112) to the stator core (111) comprises the same material as an adhesive (330) for adhering and fixing the holding portion (3) to the stator core (111).

Although the embodiment of the invention has been described, the invention according to claims is not to be limited to the embodiment. Further, please note that all combinations of the features described in the embodiment are not necessary to solve the problem of the invention.

In addition, the invention can be appropriately modified and implemented without departing from the gist thereof. For example, although the adhesion portions 33 are adhered and fixed to the stator core 111 by the adhesive 330 in the embodiment, it is not limited thereto. The adhesion portions 33 may be adhered and fixed to the stator core 111 by using a double-sided tape or a sheet-shaped adhesive sheet, etc.

In addition, although the example in which the adhesive used for fixing the coil pieces 112 is the same as the adhesive 330 used for fixing the wiring member 1 for rotating electrical machine has been described in the embodiment, it is not limited thereto. The adhesive used for fixing the coil pieces 112 may be different from the adhesive 330 used for fixing the wiring member 1 for rotating electrical machine.

What is claimed is:

1. A wiring member for a rotating electrical machine that connects coil ends of a stator to electrodes of a terminal block in a rotating electrical machine including a rotor, the wiring member comprising:
   a plurality of conductive wires; and
   a holding portion for holding the plurality of conductive wires, wherein the holding portion comprises an adhesion portion adhered and fixed to a fixing target member,
   wherein the adhesion portion comprises an introduction hole for introducing an adhesive to an interface between the holding portion and the fixing target member, and
   wherein the introduction hole penetrates through a portion of the adhesion portion in a facing direction where the adhesion portion and the fixing target member are facing each other in a rotational axis direction of the rotor.

2. The wiring member for rotating electrical machine according to claim 1, wherein the adhesion portion comprises an adhesive filling portion formed in a recessed shape on the bottom surface of the holding portion, and the introduction hole is configured to allow the adhesive to be introduced into the adhesive filling portion.

3. The wiring member for rotating electrical machine according to claim 1, wherein the holding portion comprises a plurality of holders holding the conductive wires in shape of wiring, and a molded resin portion including a molded resin so as to partially cover the plurality of holders and integrating the plurality of holders, and the adhesion portion is provided on the holder.

4. The wiring member for rotating electrical machine according to claim 3, wherein the holding portion comprises the molded resin portion provided to cover all the plurality of conductive wires together, and the adhesion portion is provided on a side where the plurality of conductive wires extend out to be connected to the coil ends, relative to the molded resin portion.

5. A rotating electrical machine, comprising:
   a stator comprising a stator core and a plurality of coil pieces adhered and fixed to the stator core;
   a rotor, and
   the wiring member for rotating electrical machine according to claim 1,
   wherein the fixing target member comprises the stator core, and an adhesive for adhering and fixing the plurality of coil pieces to the stator core comprises the same material as the adhesive for adhering and fixing the holding portion to the stator core.

6. A fixing structure of wiring member for rotating electrical machine, the fixing structure being configured that a wiring member for rotating electrical machine comprising a plurality of conductive wires and connecting coil ends of a stator to electrodes of a terminal block in a rotating electrical machine including a rotor is fixed to a fixing target member,     wherein the wiring member for rotating electrical machine comprises a holding portion for holding the plurality of conductive wires, and the holding portion includes an adhesion portion that is adhered and fixed to the fixing target member,     wherein the adhesion portion comprises an introduction hole for introducing an adhesive to an interface between the holding portion and the fixing target member, and     wherein the introduction hole penetrates through a portion of the adhesion portion in a facing direction where the adhesion portion and the fixing target member are facing each other in a rotational axis direction of the rotor.

7. The fixing structure of wiring member for rotating electrical machine according to claim 6, wherein an adhesive filling portion having a recessed shape and to be filled with an adhesive is provided on one or both of the bottom surface of the holding portion and the fixing target member, and the holding portion is adhered and fixed to the fixing target member by the adhesive filling the adhesive filling portion.

8. The fixing structure of wiring member for rotating electrical machine according to claim 7, wherein the holding portion comprises an introduction hole formed to open on a side opposite to the bottom surface and provided to introduce the adhesive into the adhesive filling portion.

9. The fixing structure of wiring member for rotating electrical machine according to claim 7, wherein the adhesive comprises a thermosetting resin.

\* \* \* \* \*